US008223616B2

United States Patent
Rutschmann et al.

(10) Patent No.: US 8,223,616 B2
(45) Date of Patent: Jul. 17, 2012

(54) REPRODUCING SYSTEM FOR USE WITH OPTICAL DEVICES

(75) Inventors: Richard Rutschmann, Wutöschingen (DE); Michael Huonker, Rosenfeld-Isingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 12/910,430

(22) Filed: Oct. 22, 2010

(65) Prior Publication Data

US 2011/0096646 A1 Apr. 28, 2011

Related U.S. Application Data

(63) Continuation of application No. PCT/EP2009/002486, filed on Apr. 3, 2009.

(30) Foreign Application Priority Data

Apr. 24, 2008 (EP) .................................. 08007948

(51) Int. Cl.
G11B 7/00 (2006.01)
(52) U.S. Cl. ..................................... 369/116; 369/47.33
(58) Field of Classification Search ................. 369/47.1, 369/47.32, 47.33, 116, 53.1, 53.22, 47.29, 369/47.3, 53.45, 53.37, 53.36, 53.32
See application file for complete search history.

(56) References Cited

U.S. PATENT DOCUMENTS

| 5,740,143 | A | * | 4/1998 | Suetomi | 369/47.33 |
| 5,822,288 | A | * | 10/1998 | Shinada | 369/47.33 |
| 7,266,073 | B2 | * | 9/2007 | Ishibashi et al. | 369/120 |
| 2004/0233825 | A1 | | 11/2004 | Ishibashi et al. | |

FOREIGN PATENT DOCUMENTS

| EP | 0465053 A2 | 1/1992 |
| EP | 0465053 B1 | 8/2002 |
| EP | 1619675 A1 | 7/2004 |
| JP | 60-239929 | * 11/1985 |
| JP | 60239929 | 11/1985 |
| JP | 2-50324 | * 2/1990 |
| JP | 10177732 | 6/1998 |
| WO | WO/2009/129921 A1 | 10/2009 |

OTHER PUBLICATIONS

International Search Report for PCT/EP2009/002486 dated May 28, 2009; 2 pages.
Extended European Search Report for EP 08007948.6 dated Jun. 9, 2009; 5 pages.

* cited by examiner

*Primary Examiner* — Nabil Hindi
(74) *Attorney, Agent, or Firm* — Brinks Hofer Gilson & Lione

(57) ABSTRACT

A reproducing system reproduces data recorded on an optical record carrier. The system includes a light source driver unit that modulates and controls a light output by a light source, such as a laser, in order to read data from an optical record carrier. The system is configured to operate in two modes: a reading mode and a light source lifetime extension mode. During the reading mode, the light source generates a continuous light output while data is read from the optical record carrier. During the light source lifetime extension mode, the light source generates a pulsed light output which may provide continued tracking and focus of the light on the optical record carrier, even when no data is being read from it.

26 Claims, 10 Drawing Sheets

REPRODUCING SYSTEM FOR USE WITH OPTICAL DEVICES

PRIORITY CLAIM

This application is a continuation application from, and claims the benefit of priority of, PCT/EP2009/002486, filed Apr. 3, 2009, which claims the benefit of priority from EP 08007948.6, filed Apr. 24, 2008. Both PCT/EP2009/002486 and EP 08007948.6 are incorporated by reference.

BACKGROUND OF THE INVENTION

1. Technical Field

The present invention relates to reproducing systems for reproducing data recorded in an optical record carrier and having a light source for reading the recorded data. More particularly, the present invention relates to a reproducing system having an improved lifetime of the light source.

2. Related Art

Demand for and use of optical drives and reproducing systems for optical discs such as CD (Compact Disc) players and DVD (Digital Versatile Disc) players as household appliances, portable devices and standard equipment of vehicles has increased in recent years. Emphasis has been put in the development of cost-effective devices with low power consumption and high durability of components. Therefore, a need exists for a reproducing system that efficiently uses a light source employed for reading data recorded in an optical record carrier, thereby, having a light source with improved lifetime.

SUMMARY

A reproducing system for reproducing data recorded on an optical record carrier may include a light source driver unit that modulates and controls a light output by a light source, such as a laser, in order to read data from an optical record carrier. The system may be configured to operate in two modes: a reading mode and a light source lifetime extension mode. During the reading mode, the light source may generate a continuous light output while data is read from the optical record carrier. During the light source lifetime extension mode, the light source may generate a pulsed light output which may provide continued tracking and focus of the light on the optical record carrier, even when no data is being read from the optical record carrier. The light source driver unit may receive signals or instructions that may indicate what mode the system is being operated in or being switched to. The light source driver unit may output to the light source signals or instructions to control the light output during the operated modes and to switch the light output when the operating mode switches. The signals or instructions output by the light source driver unit may mimic those signals or instructions received by the light source driver unit.

The reproducing system may include feedback functions, tracking functions, and/or focusing functions which may provide information to the system regarding the operation of the light source. During the reading mode, one or more of these functions may provide feedback, tracking, and focusing to the reproducing system. During the light source lifetime extension mode, one or more of these functions may be synchronized with signals or instructions sent to the light source driver, so that any feedback, tracking, and/or focusing may consider the light output during a high output pulse.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
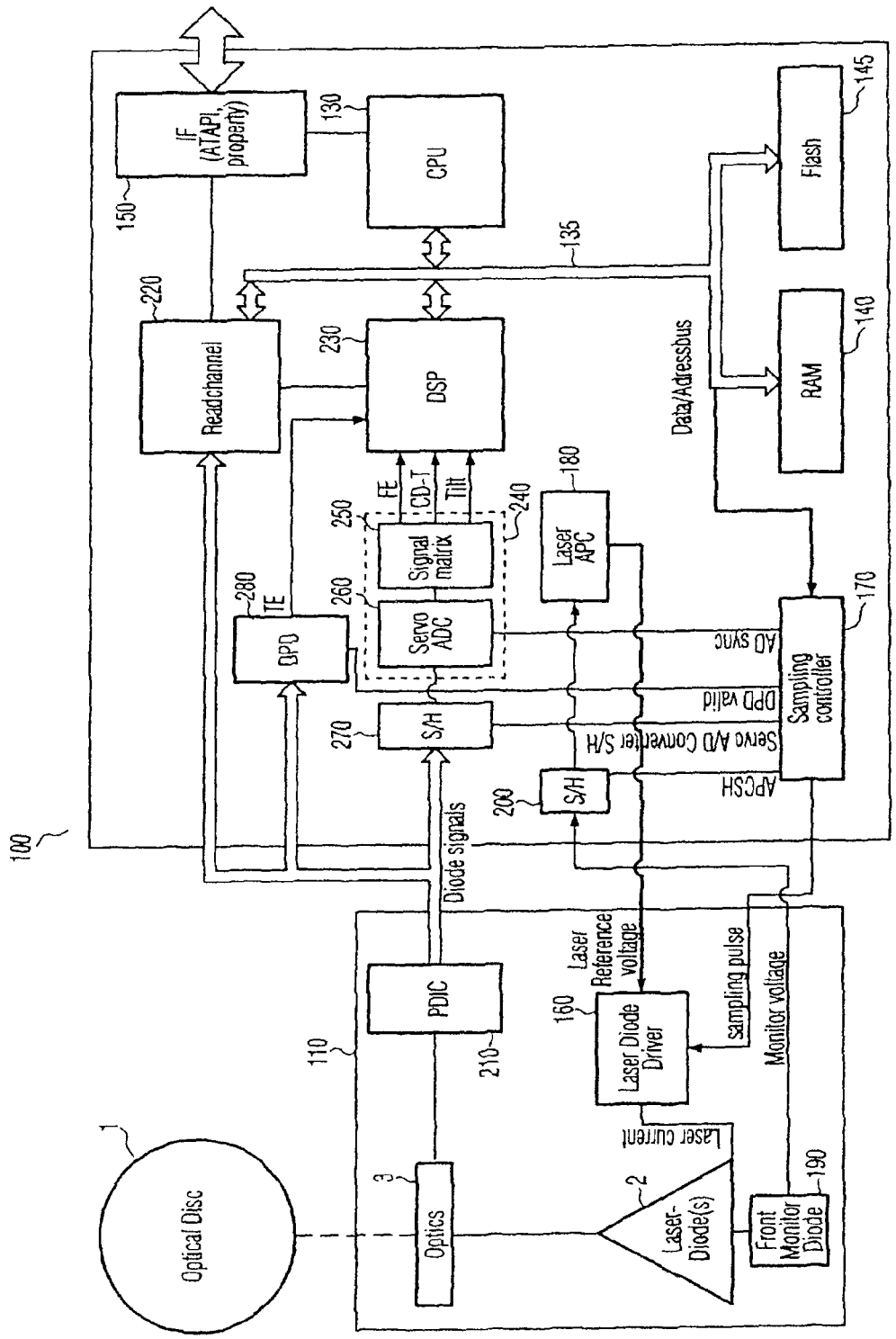
FIG. 1 is a block diagram showing an example of a reproducing system.

Light sources such as laser diodes may be used for reading data recorded in optical record carriers. The lifetime of laser diodes can decrease with an increase of ambient temperature and/or laser driving signal. An efficient operation of an optical drive may be useful for improving its components' lifetimes.

Optical drives for magneto-optical or optical discs can often read data for reproduction at a faster rate than needed by host systems. Buffers, such as track buffers, may be used from which the incoming audio/video data can be read out at a nominal speed lower than the speed at which the incoming data may be written to the buffer.

A reproducing system may use a buffer and interrupt an incoming data stream from time to time in order to avoid buffer overflow. In such reproducing systems, the laser diode may remain switched on when data is neither being read from the optical disc nor supplied to the buffer memory. The total operation time of a light source may be reduced by switching off the laser diode during a time interval, such as a laser-off time, in which the reading of data from the optical disc is interrupted. Focus and tracking servo control loops may also be switched off during the laser-off time for reducing power consumption and ambient temperature. Before restarting the reading operation, the servo controls may then be switched on close to the tangential position where they were switched off, which may avoid the need of executing a complete focus search sequence due to different focus offsets at different tangential positions on the optical disc. The laser diode may need to be switched on a certain time before the reading of data is restarted to allow time for the system to recover and re-synchronize. The system recovery and re-synchronization time may depend on several factors such as the latency time associated with the optical disc rotation, and the time required for refocusing the laser and for jumping to the track where the reading operation from the record carrier was interrupted.

For example, using as video playback parameters a system recovery and re-synchronization time of 0.14 seconds, a buffer size of 4 Mb, an outgoing data rate of 8 Mb/s and an incoming data rate of 22 Mb/s, the difference between the overall playback time and the buffer fill time plus the system recovery and re-synchronization time leads to a laser-off time of 0.18 seconds. This estimation of the laser-off time is about 36% of the overall playtime but still comparable to the system recovery and re-synchronization time in which the laser diode is on but not reading. Under these circumstances, the amount of time in which the laser diode can be effectively switched off between reading operations in these systems may not be optimal. Additionally, the complete shutdown of the focus and tracking servo loops may not be advantageous for optical drives implemented in vehicles or portable devices, which are exposed to mechanical disturbances such as vibrations or shocks. If such disturbances occur when the focus and the tracking servos are switched off, a deviation of the reproducing head from the position where it was switched off may not be promptly corrected, and a complete focus and track search sequence may be required, which may increase the amount of time during which the laser diode is on without being used for reading data.

FIG. 1 is a block diagram illustrating an example configuration of component parts of a reproducing system 100. The reproducing system 100 may have an optical pick-up or optical head 110 for reading data from an optical disc 1, such as data recorded on record tracks of an optical disc 1.

The optical disc 1 may be an optical record carrier or any other storage means suitable for recording or storing content with or without compression, that can be read by optical means. The optical disc 1 may be, for example, a magneto-optical disc, a compact disc (CD), a digital video or digital versatile disc (DVD), a Blu-Ray Disc or a High Definition (HD) disc.

The reproducing system 100 may be suitable to read, such as by the optical head 110, recorded data from the optical disc 1 by optical means. The reproducing system 100 may convert the read data into a reproducible audio and/or video signal to be reproduced. The optical means may be the same or similar to those optical means used in devices such as a CD player, a DVD player, a Blue-Ray player, or an HD player.

The recorded data may be any type of data such as image data, audio data, video data, a combination of any and the like. The recorded data may include data recorded as record tracks of the optical disc 1.

The reproducing system 100 may include a means for reproducing the converted audio and/or video signal, such as a portable CD or DVD player. Alternatively, the reproducing system 100 may not include reproduction means, but instead may supply the reproducible signal to external means for being reproduced.

The optical head 110 may include a light source, such as one or more laser diodes 2 or any other light source(s) capable of projecting light onto an optical disc 1 and create reflected light which can be detected and used to read data from the optical disc 1. The light source may be referred to as a laser diode.

The optical head 110 may include optical related components 3, such as an objective lens for focusing a spot of a laser beam emitted by the laser diode 2 onto the optical disc 1. The optical head 110 may include tracking and focusing actuators for carrying out tracking servo and focus servo adjustment of the laser beam projected on the optical disc 1. The tracking and focusing actuators, such as tracking and focus coils, may be controlled by an actuator driver for producing a movement of the optical lens in a tracking direction, such as in a radial direction of an optical disc 1, and in a focus direction, such as in a direction perpendicular to the surface of the optical disc 1. The optical head 110 may read the data recorded on the optical disc 1 by projecting a light source onto the optical disc 1 and detecting light reflected by the optical disc. For example, the optical head 110 may project a spot of laser light emitted by the laser diode 2 onto a record track of the optical disc 1 and detect a laser light beam reflected from the optical disc 1.

In FIG. 1, the reproducing system 100 is implemented with one laser diode 2 for reading data from the optical disc 1. However, the reproducing system 100 may include more than one laser diode 2. For example, a reproducing system 100 may include more than one laser diode 2 for reading content recorded in optical discs under different standards, such as DVD discs (650 nm) and CD discs (780 nm) or for reproducing more than one optical disc 1 without changing the optical disc 1.

The reproducing system 100 may have a system controller such as a CPU (Central Processing Unit) 130. The CPU 130 may control several circuit blocks of the reproducing system 100. The CPU 130 may control the reproducing system 100 via a data/address bus 135 or other bus or communication line. The CPU 130 may control the reproducing system 100 based on signals read from the optical disc 1, or under pre-defined conditions. The CPU 130 may be a component in any one of a variety of systems. For example, the CPU 130 may be part of a personal computer or a workstation. The CPU 130 may be one or more general processors, digital signal processors, application specific integrated circuits, field programmable gate arrays, servers, networks, digital circuits, analog circuits, combinations thereof, or other now known or later developed devices for analyzing and processing digital and analogue data. The CPU 130 may operate in conjunction with a software program, such as code generated manually (i.e., programmed).

The reproducing system 100 may include storage means that may store temporally and/or permanently several types of data. For example, the storage means may store data such as data and programs executed by the CPU 130, data read by the optical head 110, and data to be reproduced.

The storage means may include or be composed of, but are not limited to, computer readable storage media such as various types of volatile and non-volatile storage media, including, such as RAM (Random Access Memory), flash memory, EEPROM (Electronically-Erasable Programmable Read-Only Memory), read-only memory, programmable read-only memory, electrically programmable read-only memory, flash memory, magnetic tape or disk, optical media and the like. The storage means may include random access memory for the CPU 130. Alternatively, the storage means may be separate from the CPU 130, such as a cache memory of a processor, the system memory, or other memory. The storage means may be an external storage device or database for storing recorded data, such as a hard drive, compact disc ("CD"), digital video disc ("DVD"), memory card, memory stick, floppy disc, universal serial bus ("USB") memory device, or any other device operative to store data. The storage means may be operable to store instructions executable by the processor. In FIG. 1, the storage means include a RAM 140 and a Flash memory 145.

The storage means may include a data buffer for temporarily storing the data read by the optical head 110. The buffer may be implemented in the storage means, such as RAM 140. The buffer may be used to compensate for a difference in the rate at which data is read by the optical head 110 from the optical disc 1 and the rate at which data is processed for being reproduced or played back.

The reproducing system 100 also may include an interface (IF) 150 for interfacing with peripheral circuits. The interface 150 may be, for example, an Advanced Technology Attachment Packet Interface (ATAPI) used for connecting an optical disc drive with storage devices like hard disks inside personal computers.

The reproducing system 100 may include a laser driver unit, such as a laser diode driver 160 or any other driver for a light source in or used with the reproducing apparatus 100. The reproducing system 100 may use or include any laser driver unit having an output channel that can be pulsed or switched on/off rapidly in response to an external control signal with the desired timing. The laser diode driver 160 may be used for energizing the laser diode 2. The laser diode driver 160, may be implemented in the optical head 110, or may be alternatively implemented as a separate circuit unit in the reproducing system 100. The laser driver unit may be referred to as a laser diode driver.

The laser diode driver 160 may generate and/or output a laser driving signal that energizes the laser diode 2. The laser driving signal may modulate the optical power of the light output from the laser diode 2. The amplitude and frequency of the laser driving signal may determine the emission power and the time modulation of the laser light emitted by the laser diode 2. The laser driving signal may control the power or timing of any light emitted from a light source such as the laser diode 2. The laser driving signal may be a laser driving current. Alternatively, a laser driving voltage could also be used.

Where the reproducing system 100 is implemented with more than one grounded laser diode 2, the laser diode driver 160 may be configured with more than one laser driving signal or output for operating each laser diode. Alternatively, the reproducing system 100 may include a separate laser diode driver 160 for driving each laser diode 2. For simplicity, the reproducing system 100 will be described as including a laser diode 2 and a laser diode driver 160.

The reproducing system 100 may be configured or operable to drive the laser diode 2 to emit laser light under two distinct operation modes: a reading mode and a light source lifetime extension mode or a laser lifetime extension mode. The light source lifetime extension mode may be referred to as the laser lifetime extension mode. The reading mode refers to an operation state of the reproducing system 100 during which the optical head 110 reads data recorded in the optical disc 1 to be reproduced. The laser lifetime extension mode refers to an operation state during which the optical head 110 may not be driven for producing a signal indicative of content data such as data recorded in record tracks of the optical disc 1 and/or during which the stream of audio and/or video content data sent from the optical disc 1 to the memory buffer is interrupted, such as for avoiding buffer overflow. Where the reproducing system 100 has means for recording or writing data in the optical disc 1, recording operations may be interrupted or not take place during the laser lifetime extension mode.

In the reading mode, the content data recorded in the optical disc 1 may be read by the optical head 110 and may be stored in the data buffer. The stored content data may then be read out, such as in a first-in, first out (FIFO) sequence, to be processed and converted into a reproducible or a playback signal, such as an audio and/or video signal. Once a certain amount of content data is stored in the buffer, the operations of writing content data into the buffer and of reading out content data from the buffer to be reproduced may be substantially simultaneous.

During the operation of reading data from the optical disc 1, referred to as reading operation or reading mode, the laser diode driver 160 may generate and output a continuous laser driving signal that may drive the laser diode 2 to emit a laser beam (or other light if not a laser) with the optical power sufficient for the reading operation. The average optical power may be maintained substantially constant during the reading operation.

The high light output level and/or low light output level may indicate, refer to, and/or signify a magnitude of light energy or power with which light is emitted from the light source. The high light output level may refer to a magnitude which is larger than the low light output level. For example, the low light output level may be zero, and the high light output level may be greater than zero.

The laser lifetime extension mode may begin when a pause state or interruption in the operation of reading data from the optical disc 1 begins, and may be maintained until the pause state in the operation of reading data from the optical disc 1 is ended and the reading operation is resumed. The reproducing system 100 may then shift into the operation in the reading mode, which may be maintained until the next interruption of the incoming stream of content data.

The laser lifetime extension mode may begin when the reading mode is paused or interrupted. Since the operation of reading content data from the optical disc 1 into the buffer is interrupted, the emission of laser light at a certain constant power by the diode laser 2 may not be needed. Therefore, the laser diode driver 160 may output or be adapted, configured, operable, and/or implemented to output a laser driving signal with the form of a pulse signal with a predetermined timing or frequency for driving the laser diode 2 to emit a pulsed light source beam. The laser lifetime extension mode may be a pulsed light output mode. The light source may be switched between a high light output level and a low light output level with the predetermined timing or frequency.

During the laser lifetime extension mode, the pulsed laser beam may be switched rapidly between two spaced apart, light energy emission power levels, a high light output level (ON state) and a low light output level (OFF state), at the predetermined timing or frequency. The predetermined timing or frequency may be selected so as to minimize the duty cycle of the laser diode 2 during the pulsed light output mode for extending its lifetime. The duty cycle during the laser lifetime extension mode may be defined as the ratio between the overall time in which the laser diode emits light in the high light output level and the duration of the laser lifetime extension mode. The timing at which the laser light source is driven to switch between the two light output levels may be set in advance based on the characteristics of the host system so that the duty cycle of the laser light source during the laser lifetime extension mode is minimized.

The desired duty cycle, the duration of the laser lifetime extension mode and the number of shifts between reading mode and laser lifetime extension mode may depend on several parameters, such as the size of the audio and/or video content recorded in the optical disc 1, the buffer size, and the incoming and outgoing data rates. During playback of a whole content, the reproducing system 100 may need to switch once or several times between the operation in reading mode and in the laser lifetime extension mode. Alternatively, no transition into the laser lifetime extension mode may be desired or needed. The laser driver unit 160 may output a laser driving signal that switches rapidly between the amplitudes corresponding to the power emission desired for the ON and OFF states, which may achieve a desired duty cycle during the laser lifetime extension mode.

Figure 5:
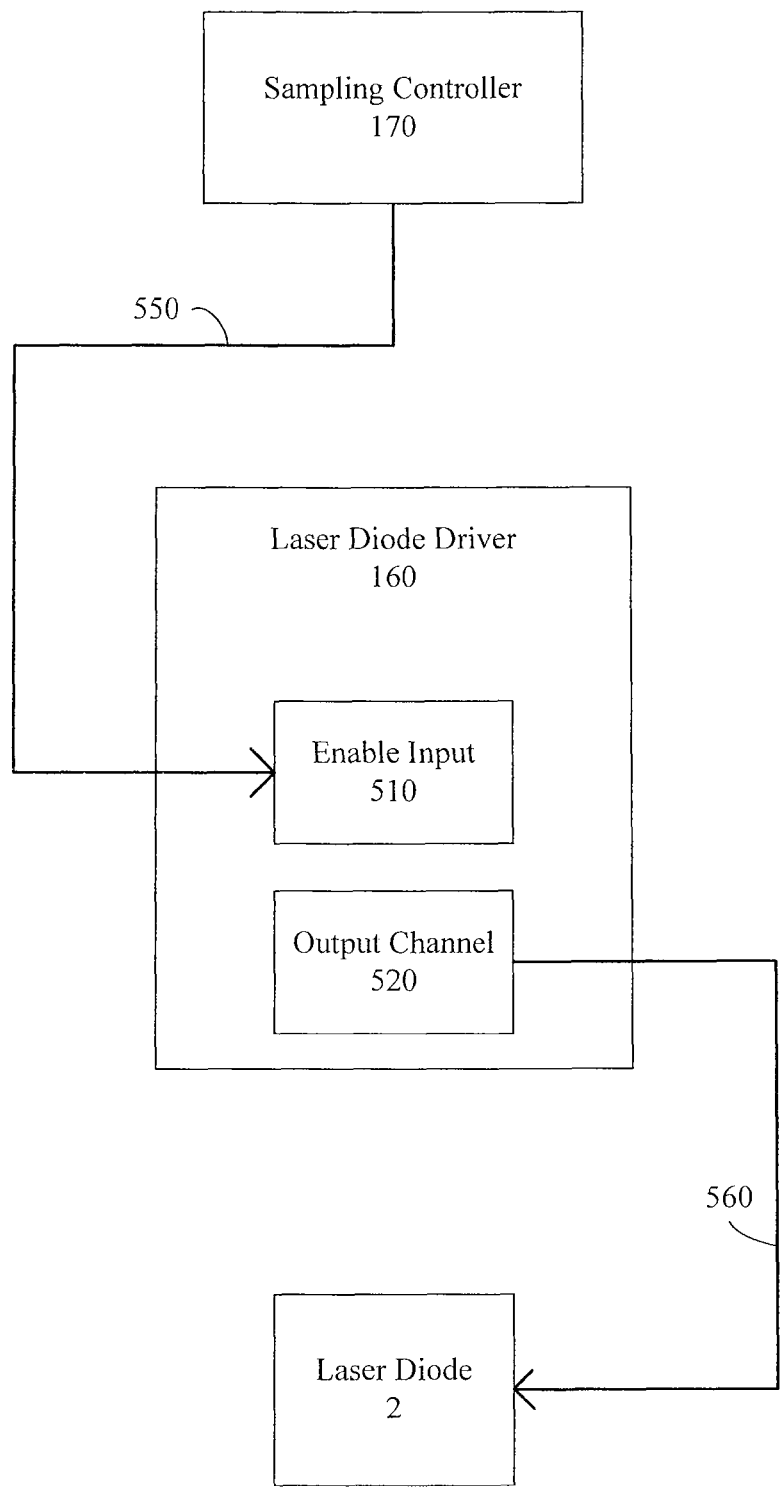
FIG. 5 is an example of some components of a reproducing system.

In FIG. 5, an example of the laser diode driver 160 may be designed with an enable input 510. The enable input 510 may allow or enable the complete shutdown of an output channel 520, such as an output current channel, for a laser driving signal, such as laser driving signal 560, when an enable signal 550 set to low is applied to the enable input 510 of the laser diode driver 160. The output channel 520 may be enabled by setting the applied enable signal 550 to high. The enable input 510 of the laser diode driver 160 may be of a digital type and may become active at the rising edge of the enable signal 550, and inactive at the falling edge of the enable signal 550.

In response to the high's and low's of the enable signal 550, which may be a timing signal, applied to the enable input 510, the laser driving signal 560 output by the laser diode driver 160 may be controlled to switch ON/OFF rapidly at substantially the same timing as the timing signal. Alternatively, the laser diode driver 160, such as or similar to those used in recorders, can be used and suitably controlled for outputting a laser driving pulse with the desired timing during the laser lifetime extension mode.

Figure 6:
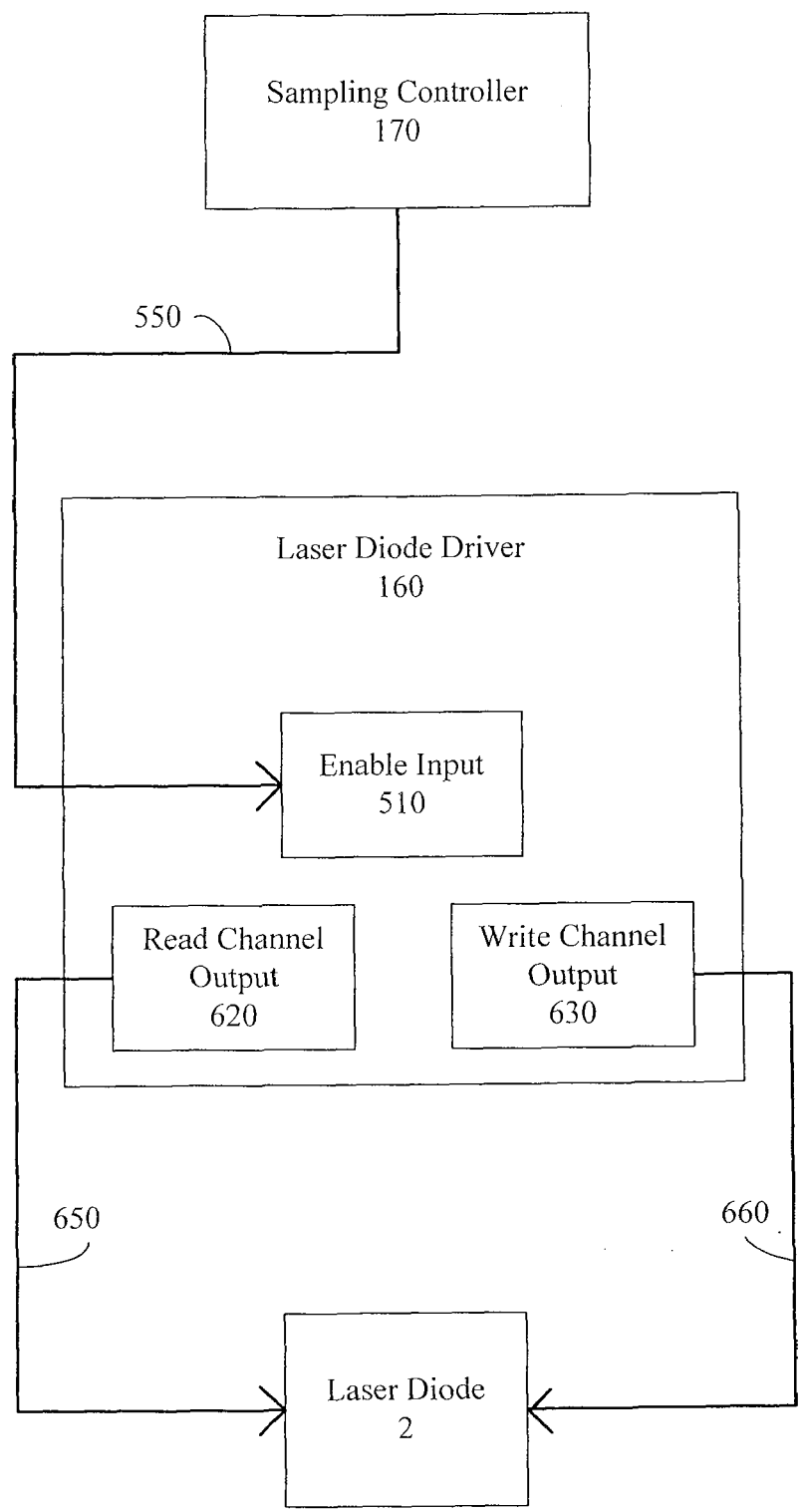
FIG. 6 is another example of some components of a reproducing system.

In FIG. 6, an example of the laser diode driver 160 may include a read channel output 620, which outputs a read laser driving signal 650 corresponding to the optical power required for the reading operation, and at least one write channel output 630, which may be controlled for outputting the pulsed laser driving signal 660 with the desired timing during the laser lifetime extension mode. The very fast switching speed of the write channel output 630 may allow outputting the pulsed laser driving signal 660 with the desired frequency during the laser lifetime extension mode. In at least this way, a laser driver unit, such as the laser diode driver 160, may be adapted, configured, and/or operable to drive the light output of the laser light source to change from the laser lifetime extension mode to the reading mode when the operation of reading data is resumed.

When the pause state in the operation of reading data from the optical record carrier ends, the laser lifetime extension mode may end. Accordingly, the laser light emitted by the laser diode 2 is driven to change from a pulsed light output, in which the laser light is emitted in the form of pulse, to a constant light output mode, in which the laser diode 2 emits a continuous laser beam having a substantially constant average emission power corresponding to the optical power necessary for reading data. If the operation of reading data of the content recorded in the optical disc needs to be interrupted and resumed several times while reproducing the content, the laser diode 2 is driven to switch accordingly between the pulsed light output mode and the constant light output mode.

By causing the laser beam to pulsate or switch on/off during the time in which the optical head is not being operated for reading data of content recorded in the optical record carrier, the present system may be configured to minimize the total amount of time the laser diode 2 emits laser light that is not being used, as well as to reduce power consumption and ambient temperature. Consequently, the lifetime of the laser diode may be increased as well as the total working hours of the reproduction device without having the laser diode replaced.

As in FIG. 1, the reproducing system 100 may have a sampling controller 170. The sampling controller 170 may serve the function of generating and outputting at least one timing signal for controlling and coordinating in time the actions of one or more circuit blocks of the reproducing system 100. The sampling controller 170 may be implemented as a separate circuit block. The sampling controller 170 may generate different timing signals depending on the circuits and/or actions to be controlled. For instance, the timing signal may be a clock signal for synchronizing the actions of two specific circuits. Circuits using the clock signal for synchronization may become active at either the rising edge, falling edge, or both edges of the clock cycle.

The sampling controller 170 may generate and output a laser driver control signal, such as a timing signal. As shown in FIGS. 5 and 6, the laser driver control signal may be applied to the enable input 510 of the laser diode driver 160, and may function as the enable signal 550. The laser driver control signal may cause the laser diode driver 160 to output a laser driving signal with substantially the same timing of the laser driver control signal.

During the reading mode, the sampling controller 170 may be adapted, configured, or operable to generate and/or output a continuous laser driver control signal. The laser driver control signal may be fed to the enable input 510 of the laser diode driver 160, and the current output 520 of the laser diode driver 160 may be maintained enabled. The laser driver control signal may have a continuous, non-zero amplitude. When the operation of reading data is paused and the laser lifetime extension mode enabled, the laser driver control signal output by the sampling controller 170 may be changed from the continuous laser driver control signal to a pulsed laser driver control signal. This may allow control over the transition between the two light output modes by using the same control signal whose timing is changed by the sampling controller.

The pulsed laser driver control signal may be a sampling pulse that oscillates between two spaced apart levels, such as 1's and 0's, with a timing that corresponds to the duty cycle desired for the laser diode 2. The pulsed laser driver control signal may be set to low during a time interval corresponding to the desired duration of the OFF state of the laser diode 2 and may be set to high during a time interval corresponding to the desired duration of the ON state of the laser diode 2 during the laser lifetime extension mode.

During the laser lifetime extension mode, the pulsed laser driver control signal may be output with a predetermined timing or frequency. The laser diode driver 160 may be adapted, configured, or operable to output a laser driving signal with the predetermined timing or frequency in response to the pulsed laser driver control signal. In order that the laser light source is driven to emit a pulse of laser light at substantially the desired timing, the output of the laser diode driver 160 (for example, the laser driving signal) may be highly responsive to the timing of the supplied timing or laser driver control signal.

In response to the pulsed laser driver control signal, the output channel 520 of the laser diode driver 160 may be intermittently enabled/disabled according to the timing of the pulsed laser driver control signal. The laser driving signal output by the laser diode driver 160 may have the form of a pulse signal that oscillates between a high and a low value with substantially the desired duty cycle, thereby causing the laser diode 2 to emit a pulsed laser beam with substantially the desired timing. The laser driving signal may be set to, for example, zero during the low light output level.

When the laser lifetime extension mode is ended and the operation of reading mode resumed, the laser driver control signal output by the sampling controller 170 may be changed from a pulse signal back to a continuous laser driver control signal. The laser diode driver 160 may adjust the amplitude of the output laser driving signal, and the optical power of the laser light emitted by the laser diode 2.

The adjustment of the amplitude of the output laser driving signal and/or the emitted optical power of the laser light emitted by the laser diode 2 may be based on a laser reference signal that is fed to the laser diode driver 160, such as by a feedback control circuit. The amount of the laser reference signal may be indicative of the desired optical power or light energy. The laser reference signal may be supplied to the laser diode driver 160 by a feedback control circuit.

The feedback control circuit may be adapted, configured, and/or operative to generate and output a feedback signal for controlling the laser driver unit to adjust a value of the laser driving signal based on an input laser monitor signal and a reference value. This may be done to cause the input laser monitor signal to converge to the reference value. The feedback control circuit may be adapted, configured, and/or operative to receive the laser monitor signal from a feedback sample-and-hold circuit.

In FIG. 1, the reproducing system 100 includes a laser Automatic Power Control (APC) circuit 180 as a feedback control circuit, and may control the laser diode driver 160 to adjust the amplitude of the laser driving signal within a desired value. Alternatively, the feedback control circuit could also be implemented using an Automatic Current Control in combination with circuitry for monitoring the ambient temperature. The feedback control circuit may avoid overshoots of the laser driving signal above a maximum operating level that may damage the laser diode 2.

The APC circuit 180 may compare a reference value corresponding to a desired light output energy level with an input control signal indicative of the light output energy level of the laser diode 2. Based on the result of comparison, the APC circuit 180 may adjust the amplitude of the laser reference signal supplied to the laser diode driver 160 so as to minimize deviations of the input control signal from the desired reference value. The laser reference signal may be a laser reference voltage.

The feedback sample-and-hold circuit, which may send a sampled laser monitor signal to the feedback control circuit, may be adapted, configured, and/or operative to receive a laser monitor signal indicative of a light output of the laser light source. In FIG. 1, the reproducing system 100 may have a front diode monitor 190. The front diode monitor 190 may be a laser monitor sensor, and may provide to the feedback sample-and-hold circuit the control signal indicative of a light output, such as the optical power, being currently emitted by the laser diode 2. The front diode monitor 190 may generate the laser monitor signal, such as a monitor voltage, which may be in proportional relation to a detected light output. The front diode monitor 190 may be implemented as a photodetector element, such as a photodiode, that generates a monitor current based on the incident laser radiation, together with an IV converter circuit for converting the monitor current into the monitor voltage.

The closed loop state of the APC circuit 180 may be maintained during the reading mode and the laser lifetime extension mode. As described, to avoid performing power feedback control during both the OFF and ON states of the laser diode 2 in response to an oscillating laser monitor voltage, the reproducing system 100 may be implemented with a feedback sample.

As mentioned, the reproducing system 100 may include a feedback sample-and-hold (S/H) circuit, such as the APC S/H circuit 200. The APC S/H circuit 200 may receive a laser monitor signal output by the front monitor 190. The laser monitor signal may be, for example, a laser monitor voltage.

The APC S/H circuit 200 may sample and hold the laser monitor signal output by the front monitor diode 190. The feedback sample-and-hold circuit may then output the sampled laser monitor signal to the APC circuit 180.

As shown in FIG. 1, the APC S/H circuit 200 may be implemented as a separate circuit between the output stage of the front diode monitor 190 and the input stage of the APC circuit 180. Alternatively, the APC circuit 180 may be implemented internally with the functionalities of the APC S/H circuit 200.

During the reading mode, the laser diode 2 may emit laser light energy with an average constant optical power. Therefore, the laser monitor signal produced by the front diode monitor 190 may be substantially constant. However, the pulsed laser beam emitted during the laser lifetime extension mode may cause the front diode monitor 190 to produce a laser monitor signal, such as a monitor voltage, that oscillates with substantially the same timing. As such, during the laser lifetime extension mode, the APC S/H circuit 200 may be controlled to sample the monitor voltage when the laser diode 2 is in the ON state and to hold the sampled value during at least the subsequent OFF state for the predetermined time. The predetermined time may be at least the amount of time in which the laser diode 2 is in the OFF state.

The sampling frequency of the feedback sample-and-hold circuit, such as APC S/H circuit 200, may be externally controlled by a feedback sample-and-hold signal which may be generated by the sampling controller 170 and/or output by the sampling controller 170 to the APC S/H circuit 200. This feedback sample-and-hold signal, which may be referred to as APC S/H signal, may be synchronized with the laser driver control signal so that the sampling of the monitor voltage coincides with the ON states of the pulsed light output during the laser lifetime extension mode. The frequencies of the APC S/H signal and the laser driver control signal may be identical or substantially the same.

The sampling controller 170 may be adapted, configured, and/or operative to generate and/or output a feedback sample-and-hold signal with a first predetermined timing or frequency during the laser lifetime extension mode. The feedback sample-and-hold signal may be generated and/or output so as to control the feedback sample-and-hold circuit to sample the received laser monitor signal when the laser light source is in the high light output level and to hold the sampled laser monitor signal during at least the duration of the subsequent low light output level. The high output level may also be referred to as the high light output level. The low output level may also be referred to as the low light output level.

Figure 2:
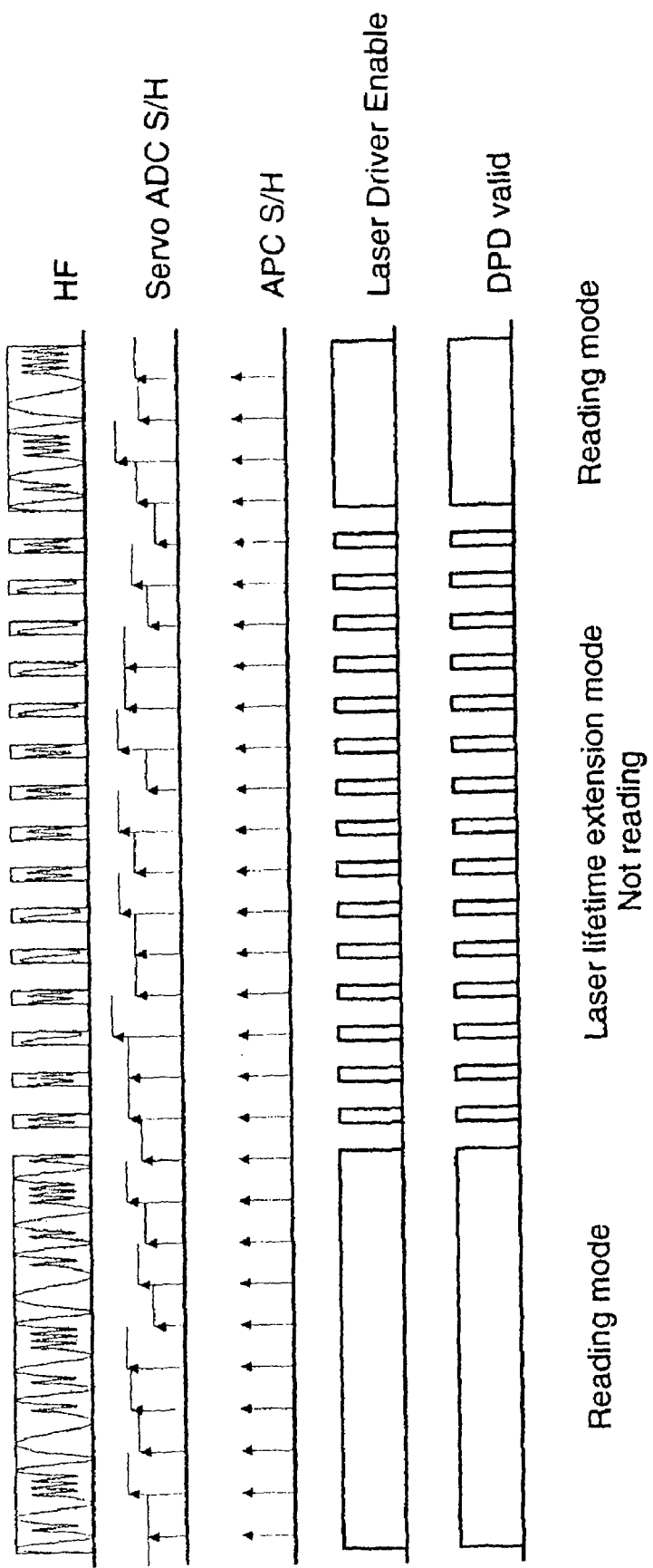
FIG. 2 is a diagram illustrating an example of signals of a reproducing system.

As shown in FIG. 2, the APC S/H signal may be synchronized with the laser driver control signal so that the sample time (indicated as an upward arrow) is made to coincide with each high level of the laser driver control signal. Alternatively or in addition, the APC S/H signal may have a different frequency. For example, the APC S/H signal may have a different frequency where, for example, the sample time is made to coincide with a high level of the laser driver control signal.

The sampling controller may generate the APC S/H signal with the same sampling frequency during the reading mode. Alternatively, other sampling frequencies may be generated during the reading mode.

Where the sample time coincides with the each high level of the laser driver control signal, the sampled laser monitor signal fed by the APC S/H circuit 200 to the APC circuit 180 may always be indicative of the light output during the ON state of the laser diode 2. Consequently, the APC circuit 180 may not need to perform feedback control during an OFF state of the laser diode 2 but may provide a laser reference signal to the laser diode driver 160 that is always adjusted with respect to an optical power detected during a ON state. In these examples, although during the subsequent OFF state the APC circuit 180 may continue to output the laser reference signal that was adjusted based on the monitor voltage sampled during the previous ON state, this laser reference signal may have little or no effect on the laser diode driver 160 since the output channel 520 of the laser diode driver 160 may be disabled during the OFF state by the low in the laser driver control signal.

Figure 7:
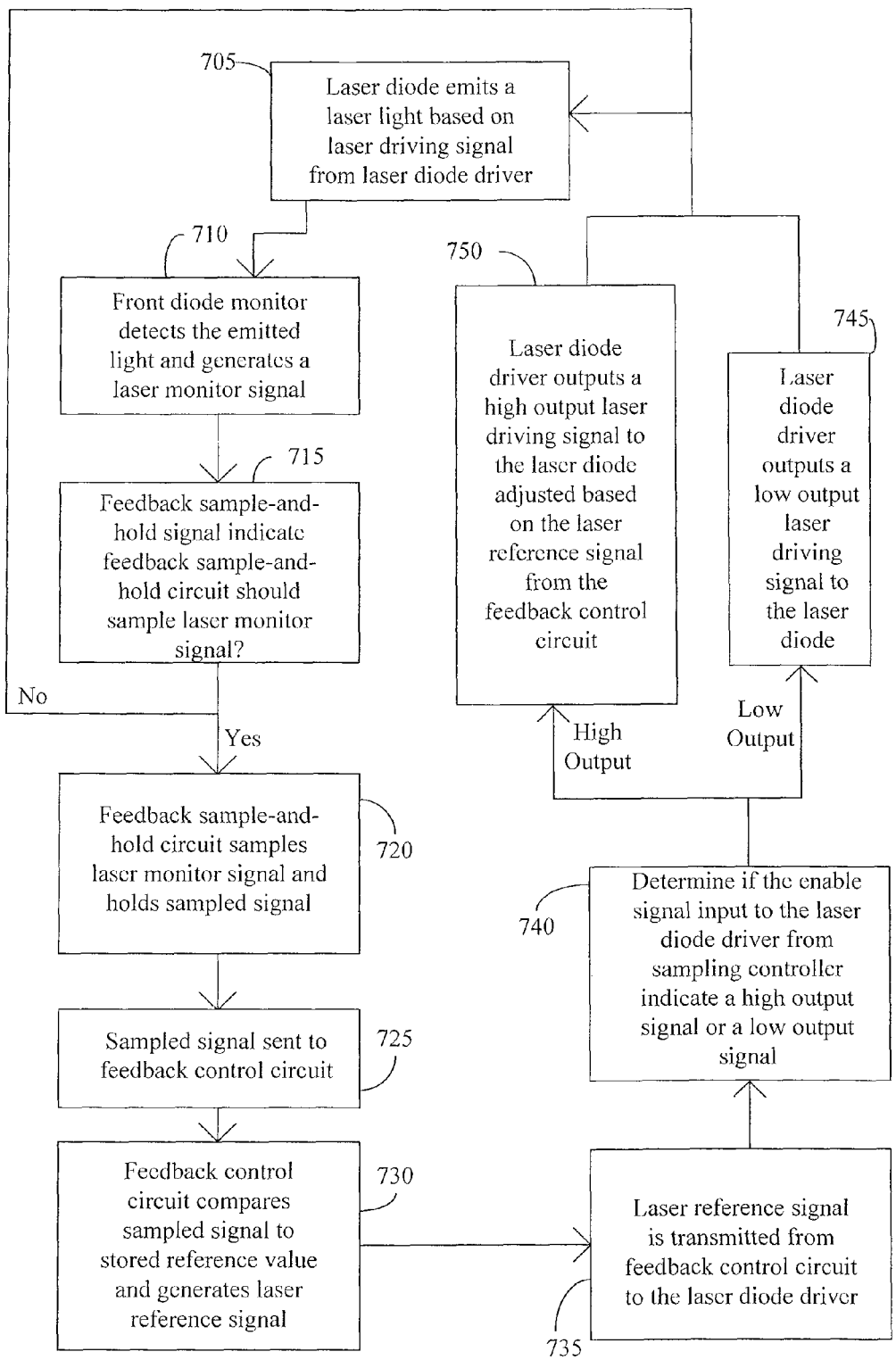
FIG. 7 is an example of operation flow diagram of a reproducing system.
Figure 8:
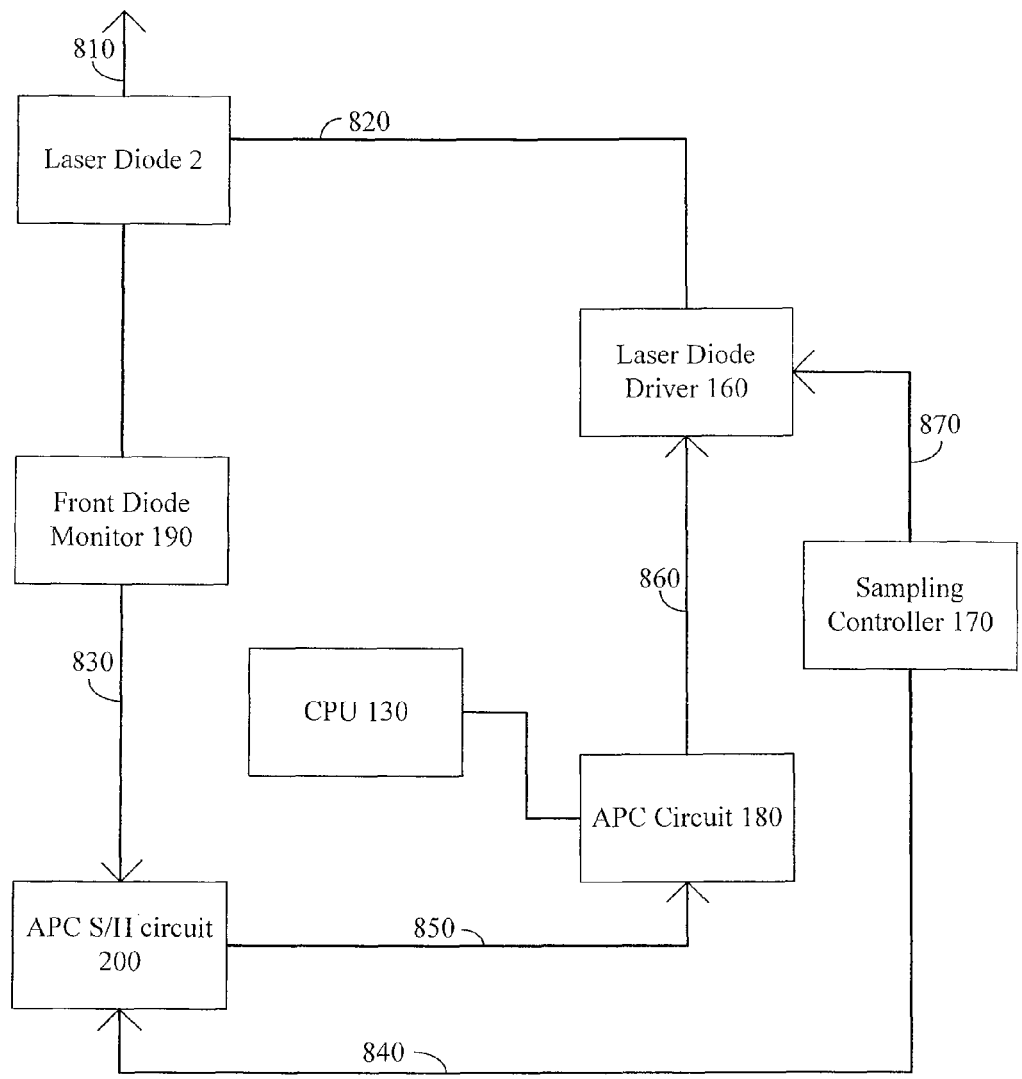
FIG. 8 is another example of some components of a reproducing system.

FIGS. 7 and 8 show an example of the feedback process and system. At step 705 in FIG. 7, the laser diode 2 emits a laser light, such as laser light 810, based on a laser driving signal, such as laser driving signal 820, from the laser diode driver 160. The front diode monitor 190 detects the emitted light at step 710 and generates a laser monitor signal, such as laser monitor signal 830. At step 715, a determination is made as to whether the feedback sample-and-hold signal, such as feedback sample-and-hold signal 840 received from the sampling controller 170, indicates the feedback sample-and-hold circuit, such as APC S/H circuit 200, should sample the laser monitor signal. If it does not, the process goes back to and repeats step 705. If the feedback sample-and-hold signal 840 does indicate that the feedback sample-and-hold circuit should sample the laser monitor signal 830, the feedback sample-and-hold circuit samples the laser monitor signal 830 and hold it at step 720. At step 725, the sampled signal, such as sampled signal 850, is sent to the feedback control circuit, such as APC circuit 180. At step 730, the feedback control circuit compares the sampled signal 850 to stored predetermined reference values and generates a laser reference signal, such as laser reference signal 860. The reference values may, for example, be stored in CPU 130 or memory. At step 730, the laser reference signal 860 is transmitted by the feedback control circuit to the laser diode driver 160. At step 740, it is determined if the enable signal, such as the laser driver control signal 870, input to the laser diode driver 160, such as by the sampling controller 170, indicates a high output signal or a low output signal. If a low output signal is indicated, the process proceeds to step 745, where the laser diode driver 160 outputs a low output laser driving signal to the laser diode 2. If a high output signal is indicated, the process proceeds to step 750, where the laser diode driver 160 outputs a high output laser driving signal to the laser diode 2, with the signal adjusted based on the laser reference signal from the feedback control circuit. In either case, the loop completes back at step 705, where the laser diode 2 emits a laser light 810 based on a laser driving signal 820 from the laser diode driver 160. In this way, the feedback control circuit may ensure that certain characteristics of the light emitted from the laser diode 2 converge to a defined reference value.

By implementing a sample-and-hold circuit at a stage prior to the feedback control circuit and by synchronizing the sample-and-hold circuit with the pulse of laser light emitted during the laser lifetime extension mode, the present system may be adapted, configured, and/or operative to supply an input signal to the feedback control circuit that corresponds to substantially the same light output level. In at least this way, the feedback control circuit may serve the purpose of adjusting the optical power of the laser beam emitted by the laser light source to a desired level. The feedback control of the optical power may remain active also during the pulsed light output mode and may effectively adjust the optical power of the laser light emitted during successive, similar light output levels based on a signal indicative of similar optical power.

The reference values to be used by the APC circuit 180 may be stored in the storage means of the apparatus. The reference value corresponding to the optical power to be used during an ON state in the laser lifetime extension mode may be the same as the reference value to be used during the reading mode. Alternatively, these references values may be set differently, so that the optical power emitted in the ON state will be different from the optical power emitted during the reading mode.

The reproducing system 100 may include a photo-detector integrated circuit (PDIC) 210. The PDIC 210 may be a photo-detector unit, and may be implemented in the optical head 110. The PDIC 210 may detect a laser beam reflected by the optical disc 1, such as through the optical related components 3, and, based on the detected laser beam, may supply diode signals to external processing circuits for extracting various types of information from the supplied diode signals.

One of the external processing circuits which may receive diode signals from the PDIC 210 may be a read channel unit 220. The read channel unit 220 may be included in the reproducing system 100. Based on the diode signal supplied by the PDIC 210, the read channel unit 220 may create a high frequency (HF) signal as reproduction data. The HF signal may be sent to and processed by a digital signal processor (DSP) 230.

Figure 9:
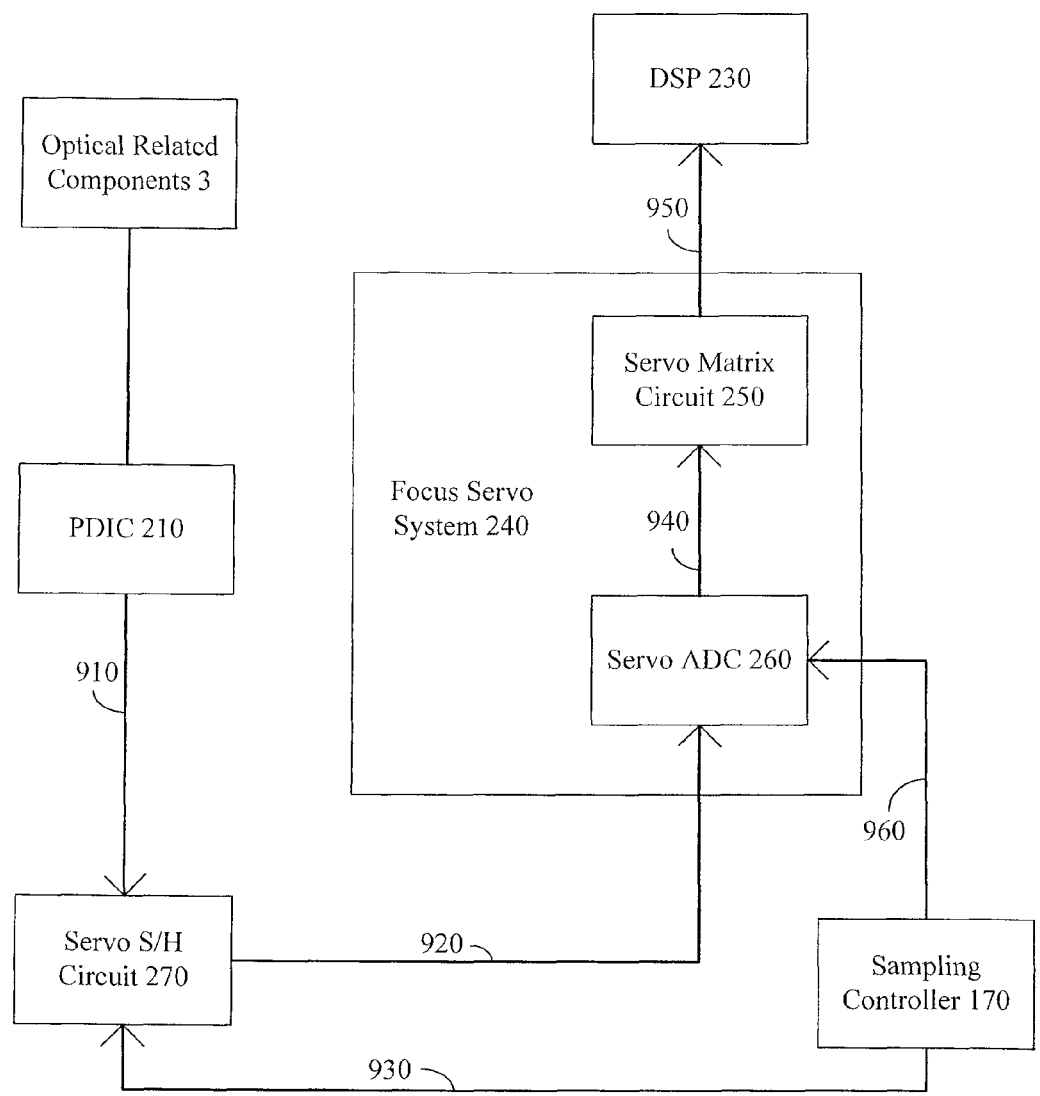
FIG. 9 is another example of some components of a reproducing system.

In FIGS. 1 and 9, the reproducing system 100 may have a focus servo system 240. The focus servo system 240 may produce servo signals, such as servo signals 950, for performing focus control of the laser beam incident on the optical record carrier. This may be based on a signal indicative of a laser beam reflected from the optical record carrier during the laser lifetime extension mode. For example, the laser beam spot may be projected onto a record track of the optical disc 1. The focus servo system 240 may be engaged during both the reading mode and the laser lifetime extension mode. In this way, the waiting time required by the focus servo system 240 for performing an entire focus sequence when it is switched on may be reduced or eliminated, and the amount of time the laser diode 2 needs to be ON is reduced, thereby improving the lifetime of the laser diode 2.

The focus servo system 240 may include a servo matrix circuit 250 and a servo analog-to-digital converter 260 (Servo ADC). The Servo ADC 260 may convert an input analog signal, such as an input analogue signal 920 from a servo sample-and-hold circuit 270, into a digital signal. The Servo ADC 260 may output the digital signal, such as digital signal 940, to the servo matrix circuit 250. The servo matrix circuit 250 may generate the servo signal 950, such as the focus error signal (FE), a tilt error signal (Tilt), or the like. These generated servo signals 950 may be based on the digital signal 940 received from the Servo ADC 260. The generated servo signals 950 may be supplied to the DSP 230. DSP 230 may execute phase compensation processing, gain correction processing, and/or the like, of the received servo signal. The processed servo signals may be applied to the actuator driver for performing focus servo control.

The laser diode 2 may be switched on until the analog input stage of the APC circuit 180 and at the Servo ADC 260 is settled. Since the servo may maintain its operation, the diode signals supplied to the servo circuit block may need to be sampled.

The reproducing system 100 may have a focus servo sample-and-hold circuit 270, referred to as Servo S/H circuit 270. The Servo S/H circuit 270 may be implemented at a stage prior to the Servo ADC 260, and may output a sampled signal, such as sampled analogue signal 920, to the Servo ADC 260. The Servo S/H circuit 270 may serve the purpose of sampling an analogue diode signal received from the PDIC 210, and/or of holding the received analogue value steady for a predetermined time before feeding the analogue diode signal to the Servo ADC 260. During the pulsed light output mode, the Servo S/H circuit 270 may be controlled to sample, using the PDIC 210, the analogue diode signal, such as diode signal 910, while the laser diode 2 is emitting in the ON state, and/or to hold the sampled signal at least during the subsequent state during which the laser diode 2 is in the OFF state.

The sampling rate of the Servo S/H circuit 270 may be externally controlled by a focus sample-and-hold signal, which may be referred to as a Servo ADC S/H signal. The sampling controller 170 may be adapted, configured, and/or operative to generate and/or output or supply the focus sample-and-hold signal, such as focus sample-and-hold signal 930. The focus sample-and-hold signal 930 may be output with a second predetermined timing or frequency during the laser lifetime extension mode so as to control the focus servo sample-and-hold circuit to sample the received diode signal 910 when the laser light source is in the high light output level and to hold the signal during at least the duration of the subsequent low light output level.

As shown in FIG. 2, the sampling controller 170 may generate the Servo ADC S/H signal with a sampling frequency that is substantially the same as the frequency of the laser driver control signal during the laser lifetime extension mode. Further, the Servo ADC S/H signal may be synchronized with the laser driver control signal, so as to cause the Servo S/H circuit 270 to sample the signal supplied by the PDIC 210 when the laser diode 2 is in the ON state and to be hold during the OFF state. As in FIG. 2, the sampling controller 170 may synchronize the laser driver control signal and the Servo ADC S/H by making the sample time of the Servo ADC S/H signal coincide with an instant in which the laser driver control signal is in the high level. Alternatively, the frequency of the Servo ADC S/H signal may be set differently while maintaining the synchronization of the sample time with the high level of the laser driver control signal.

For simplicity, the sampling rate of the Servo S/H circuit 270 may be maintained when the reading mode is resumed. Alternatively, the sampling frequency of the Servo ADC S/H signal may be set differently during the reading mode. For example, in order to provide a finer servo control during the reading mode, the sampling rate may be increased, being only limited by the minimum time required by the Servo ADC 260 to convert the received analogue signals.

The sampling controller 170 may also generate another timing signal, an A/D synchronization signal such as A/D synchronization signal 960, which may be supplied to the Servo ADC 260 for synchronizing the analogue-digital conversion. The Servo ADC 260 may be implemented with internal sample and hold circuitry for sampling and holding an input signal for the time required for the internal analog-to-digital conversion.

The Servo S/H circuit 270 and the Servo ADC 260 may be separate circuits. Alternatively, the functionality of the Servo S/H circuit 270 may be implemented in the Servo ADC 260, which may be designed with an additional control input for applying the external Servo ADC S/H signal.

The reproducing system 100 may include a tracking servo system for irradiating laser light onto a pit sequence with high accuracy. The tracking servo system may produce tracking servo signals for performing tracking control of the laser beam spot that is projected onto the optical disc 1 with respect to a record track. The tracking servo system may be adapted, configured, and/or operative to perform tracking control of a laser beam incident on a record track of the optical record carrier based on a signal indicative of a laser beam reflected from the optical record carrier. The tracking servo system may be maintained engaged during the laser lifetime extension mode.

The tracking servo system may include a tracking error detection circuit. The tracking error detection circuit may use differential phase detecting methods. The method may rely on the fact that when laser light reflected from a disc surface is received by a photo-detector device divided into a number of light-receiving portions, a phase difference may be generated between the signals output from each divided portion. The detected phase difference may be used to generate a tracking error signal (TE) that may be indicative of the amount of tracking error. Feedback tracking control may then be performed using the obtained TE signal.

As shown in FIG. 1, the reproducing system 100 may include a differential phase detector (DPD) circuit 280. The DPD circuit 280 may obtain phase difference information from the diode signal supplied by the PDIC circuit 210. The DPD circuit 280 may convert the phase difference information into an analog amount (for example, a voltage value). The DPD circuit 280 may pass the obtained analog amount to the DSP circuit 230 at the subsequent stage for processing.

Alternatively, the DPD circuit 280 may calculate the track error based on timing information of the pit edges (time difference measurement of diodes). While the laser is on, the DPD circuit 280 may measure the time difference, and may calculate the tracking error.

The tracking servo system may be maintained engaged during the reading mode, the laser lifetime extension mode and the transition between the two modes. In these examples, when the laser lifetime extension mode is exited and the reading mode is resumed, it may not be necessary to switch on the laser diode 2 before effectively starting reading data from the optical disc 1 in order to allow an entire tracking sequence to be performed. In this way, the time the laser diode 2 is switched on without reading data may be further reduced and its lifetime improved.

In order to maintain the tracking servo control engaged during the laser lifetime extension mode, the DPD circuit 280 is controlled to measure and calculate the tracking error while the laser diode 2 is emitting in the high light output level. This synchronization of the tracking error detection is achieved by applying a DPD valid signal with a predetermined timing or frequency to the DSP circuit 230.

The sampling controller 170 may be adapted, configured, and/or operable to generate and output a tracking servo control signal, such as the DPD valid signal, with a predetermined timing or frequency during the laser lifetime extension mode. This may allow control over the tracking servo system to perform the tracking control based on the signal indicative of the laser beam reflected from the optical record carrier that is obtained when the laser light source is in the high light output level.

The DPD valid signal may be another timing control signal. As shown in FIG. 2, the DPD valid signal may be essentially set to high during the reading mode in which the laser diode 2 is emitting at approximately constant optical power for reading data. When the reading operation is paused and the laser lifetime extension mode is started, the sampling controller 170 may switch the DPD valid signal from the continuous signal to a pulse or clock signal with the desired timing.

The frequency of the DPD valid signal may be the same as the frequency of the pulsed laser driver control signal. In addition, the sampling controller 170 may synchronize the DPD valid signal with the laser driver control signal so that the DPD circuit 280 may perform tracking detection only when the laser diode 2 is emitting in the high light output state in response to the DPD valid signal. For example, the sampling controller 170 may synchronize the rising edge of the DPD valid signal with the rising edge of the laser driver control signal as well as the falling edges of the two signals.

The characteristics of the pulsed laser light output, such as the time duration of the high light output level and the pulse frequency, may be defined based on the characteristics of the reproducing system 100. These also may determine the characteristics of the timing signals generated by the sampling controller 170, such as the laser driver control signal, the DPD valid signal, the APC S/H signal and/or the Servo ADC S/H signal. The characteristic parameters of these signals may be pre-stored in the storage means, such as RAM 140.

During the laser lifetime extension mode, the sampling controller 170 may be adapted, configured, and/or operative to synchronize at least one of the feedback sample-and-hold signal, focus sample-and-hold signal, and tracking servo control signal with the pulsed laser driver control signal. In this case, by synchronizing the sample-and-hold signals with, for instance, the high level of the pulsed laser driver control signal, the corresponding sample-and-hold circuits may be controlled to sample the received signals when the laser light source is emitting in the high light output mode and to hold the sampled signal during at least the duration of the subsequent low output level. When the tracking servo control signal is synchronized with the high level of the pulsed laser driver control signal, the tracking servo system may perform tracking control using a signal detected when the laser light source is emitting in the high light output level. The synchronization of the feedback sample-and-hold circuit, focus servo sample-and-hold circuit and/or tracking servo system may allow the feedback and servo control operations to be based on a same diode signal detected during the same emission level, that is, when the optical power is at the highest level. Further, since the feedback and servo control operations may be coordinated to be performed simultaneously, the duration of the high light output mode may be reduced to a minimum thereby further reducing the duty cycle of the laser light source during the laser lifetime extension mode. In addition, since during the low light output level the laser beam is not used, the low light output level may be set to null optical power for further improving the lifetime of the laser light source.

As described, the laser diode 2 may remain switched on until the analog input stage of the APC circuit 180 is settled. In addition, since the focus and/or tracking servo controls may remain engaged during the laser lifetime extension mode, the pulse width, that is, the time duration of the ON state, may be or may be required to be long enough to allow the focus and/or tracking servo systems to detect and maintain servo errors to a minimum.

As an example, the pulse width may be at least limited by the settle time of the input stage of the Servo ADC 260. The pulse width may be very narrow (a few 10's of ns wide), which translates into a laser duty cycle of 1/100 or lower. In addition, it may be beneficial for maintaining effective engagement during the pulsed light output if the width of the pulsed laser beam were long enough to allow the detection of a few pit/land transitions in the optical disc 1 so that the tracking servo system might get a valid tracking signal. In one example, the lifetime of the laser diode 2 may be maximized by setting the pulse width of the laser driver control signal to be generated by the sampling controller 170 as the maximum amount of the time required by the DPD circuit 280 for obtaining a valid tracking signal and the settle times of the laser APC 180 and the Servo ADC 260.

The maximum duration of each OFF state may be determined based on the maximum hold time of the sampling-and-hold circuits as well as the frequency at which the diode signals and the monitor voltage need to be sampled to maintain an efficient power feedback and servo controls. The duty cycle of the laser diode 2 during the pulsed light output mode, that is, the duration of the ON and OFF states and pulse frequency, may be stored in advance in the storage means 140 of the reproducing system 100 to be used by the CPU 130 and/or the sampling controller 170 for generating the timing signals with the desired timings. The sampling controller 170 may refer to the stored parameters for generating a pulsed laser driver control signal with the corresponding time characteristics. The duration of the laser lifetime extension mode as well as the transition between enablement of the reading mode and the laser lifetime extension mode may be coordinated by the CPU 130 and may depend on several factors, such as characteristics of the reproducing system 100 and/or of the content to be reproduced.

By maintaining the focus and/or tracking servo controls engaged during the pulsed light output mode, it may not be necessary to perform a complete refocusing and/or tracking operation of the laser beam incident on the optical record carrier once the reading operation is resumed. It is also possible to maintain the tracking control engaged without the need of maintaining the laser diode 2 continuously switched on when the operation of reading data from the optical disc 1 is paused. This may allow a further reduction of the time the laser is on without reading data and therefore, an increase in the duration of the laser lifetime.

As mentioned previously, the reproducing system 100 may use a buffer to compensate for differences between the rate at which data is read from the optical disc 1 and the rate at which data is reproduced. When data is written into the buffer (incoming stream of data) at an incoming data rate higher than the rate at which data is read out from the buffer (outgoing stream of data), the buffer may fill over time and reach eventually its full capacity before the whole content stored in the optical disc 1 has been read.

The operation of reading data from the optical disc 1 into the buffer may then be interrupted or paused for a certain time amount to avoid buffer overflow and the laser diode 2 is driven in the laser lifetime extension mode for improving its lifetime. The duration of the laser lifetime extension mode and the transition between the reading mode and the laser lifetime extension mode may be controlled dynamically by the CPU 130 based on the fill level of the buffer. The operation of reading data from the optical disc 1 into the buffer may be interrupted or paused when the buffer reaches any determined fill level, such as when the buffer is half full, 85% full, or completely full. Alternatively, the operation may be interrupted or paused after a preset, selected, or determined time or interval, which may be predetermined or set irrespective of the buffer fill level.

Figure 3:
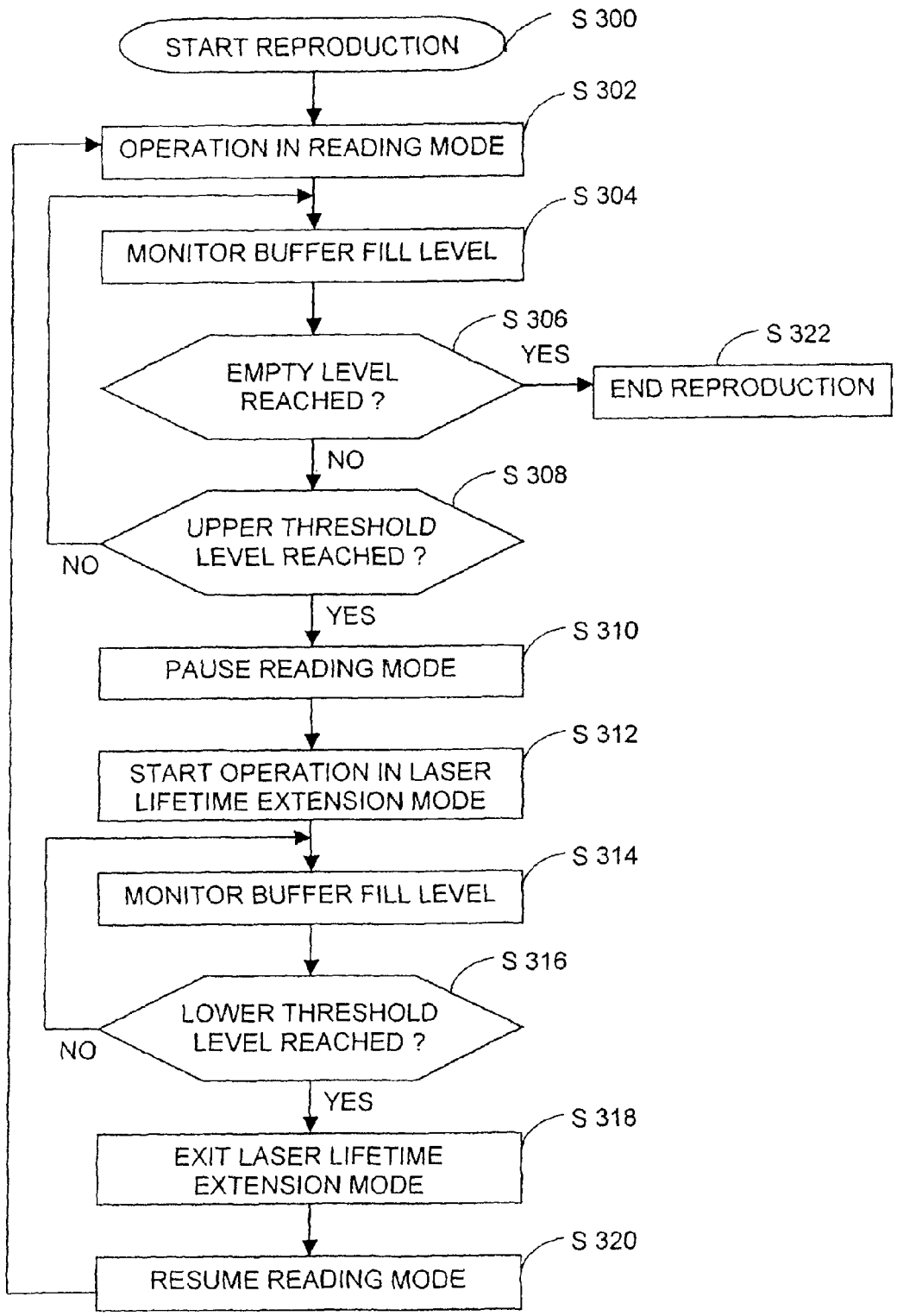
FIG. 3 is an example of operational flow diagram of a reproducing system.

FIG. 3 illustrates a sequence of logical steps that may be performed by the reproducing system 100. For example, the logical steps may be performed by the CPU 130.

Once the reproducing system 100 starts the reproduction of content from the optical disc 1 in step S 300, the method proceeds to step S 302 in which several operations performed by the reproducing system 100 may be controlled in the above-described reading mode. These operations may include reading content data from the optical disc 1, storing the content data processed by the read channel unit 240 in the buffer, and reading out data from the buffer to be reproduced. In addition, as described above, the operation in the reading mode may also include at least one of power feedback control, focus control and tracking control.

The method includes a step S 304 in which the fill level of the buffer may be monitored so that the incoming stream of data into the buffer may be controlled based on the detected buffer fill level. The buffer fill level may indicate the amount of data stored in the buffer or the space available in the buffer. The buffer fill level may be monitored continuously or at certain time intervals.

The method then includes a step S 306, in which it may be determined whether the amount of data stored in the buffer has reached an empty level. If a NO answer is obtained, the method proceeds to step S 308 in which it may be determined whether the buffer fill level has reached a predetermined upper threshold level. If a YES answer is obtained, the method proceeds to step 310, in which the CPU 130 may instruct a pause in the reading mode. The incoming data stream may be interrupted. The method then proceeds to step S 312, in which operation in the laser lifetime extension mode may be enabled and initiated.

As described above, during the operation in the laser lifetime extension mode, the incoming stream of data into the buffer may be interrupted while data stored in the buffer continues to be read out to be reproduced. The operation of reproducing the content may therefore be maintained during the laser lifetime extension mode without interruptions. Where the reproducing system 100 is also implemented for recording data in the optical disc 1, no operations of writing data onto the optical disc 1 may be performed during the laser lifetime extension mode.

The operation in the laser lifetime extension mode may also include instructing the sampling controller 170 to change the laser driver control signal and/or DPD valid signal from continuous to pulse signals as previously described. Once the laser lifetime extension mode is initiated, the method includes a step S 114 of monitoring the fill level of the buffer, which is followed by a step S 116 in which it may be determined whether the fill amount of data stored in the buffer has reached a predetermined lower threshold value. If the obtained answer is NO, the operation in the laser lifetime extension mode may be maintained and steps S 114 and S 116 are repeated.

When it is determined that the lower threshold value is reached, the method proceeds to step S 118, in which the operation in the laser lifetime extension mode may be ended. The method then proceeds to step S 320 in which the operation in the reading mode may be resumed. Subsequently, the method returns to step S 302 and repeats steps 302 to 318 until all content data has been read from the optical disc 1 and reproduced. Eventually, when it is determined in step S 306 that the fill level of the buffer has reached an empty level, the method proceeds to step S 222 and the reproduction of content may be ended.

Figure 4:
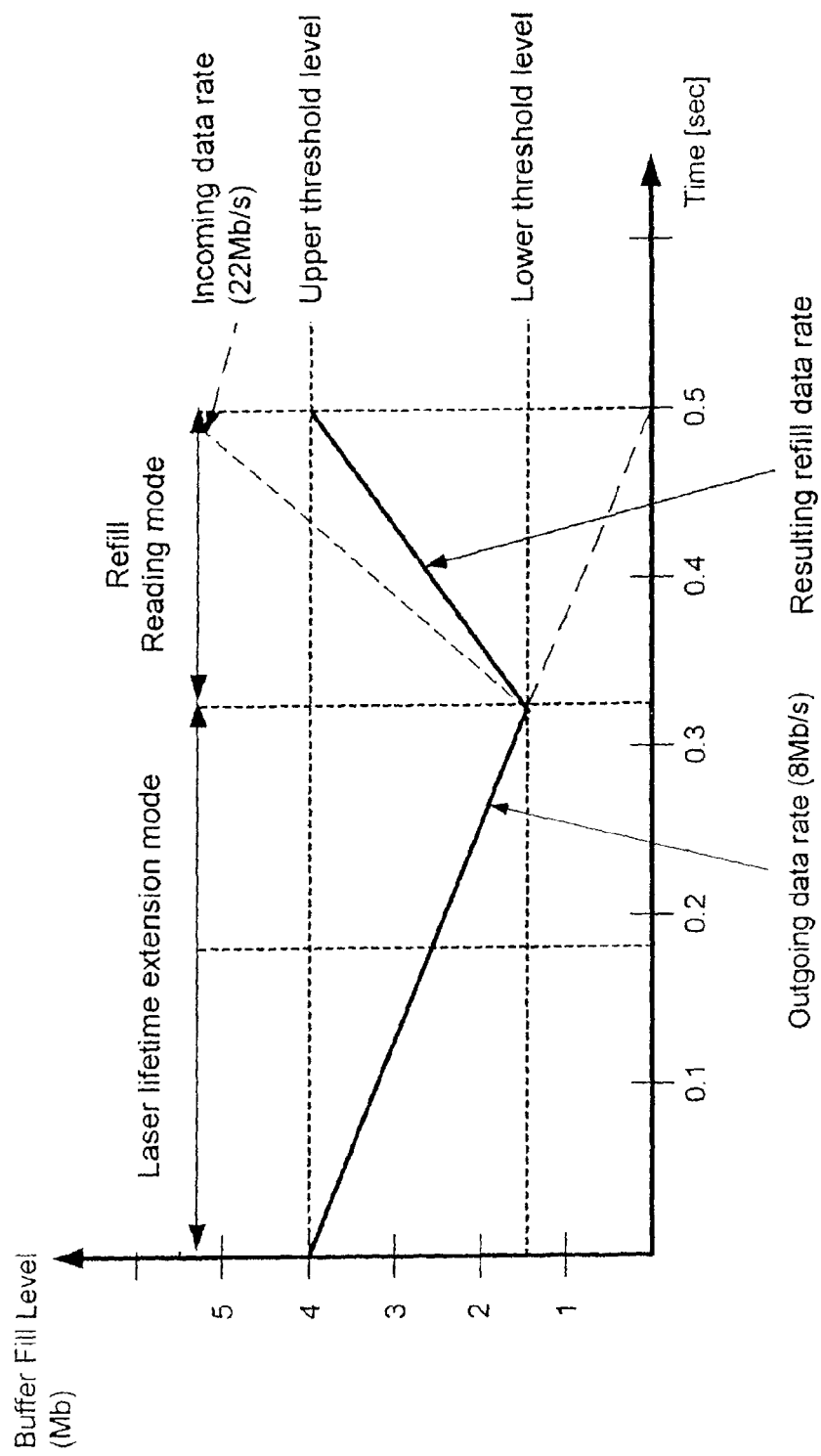
FIG. 4 is a graph showing an example of a buffer fill level of a reproducing system.

FIG. 4 illustrates the variation of the buffer fill level during a laser lifetime extension mode and a subsequent reading mode of the reproducing system 100. In FIG. 4, the fill level of the buffer is initially at the predetermined upper threshold level, which in the illustrated example coincides with the full capacity of the buffer, such as 4 Mb. To avoid buffer overflow, once it is determined that the amount of data stored in the buffer reaches the specified upper threshold level, the incoming stream of data read from the optical disc 1 into the buffer may be interrupted and the laser lifetime extension mode may be enabled and initiated for extending the lifetime of the laser diode 2. During the laser lifetime extension mode, the CPU 130 may continue to read out data from the buffer to be reproduced. The fill level of the buffer may decrease linearly with time at the same rate at which data is being read out from the buffer. At the same time, the CPU 130 may continue to monitor the fill level of the buffer.

When the fill level reaches a specified lower threshold value, such as, in the illustrated example, 1.5 Mb, the CPU 130 may instruct the end of the laser lifetime extension mode and may shift into the normal reading mode, thereby enabling and resuming operation of reading data from the optical disc 1. Since the focus and tracking controls may be maintained engaged during the laser lifetime extension mode as described above, no waiting time may be needed for performing tracking and focus operations. Therefore, once the lifetime extension mode is ended, the operation of reading data from the optical disc 1 may be restarted almost immediately. Accordingly, the incoming data stream into the buffer may be restarted and the buffer may be refilled at a rate corresponding substantially to the difference between the incoming data rate and the outgoing data rate. The CPU 130 may maintain the monitoring of the buffer fill level and when the CPU 130 detects that the upper threshold level is reached, the CPU 130 may interrupt again the incoming stream of data to avoid buffer overflow. At this point, the CPU 130 may instruct the transition to the laser lifetime transition mode in order to save the lifetime of the laser diode 2. In this example, the adjustment of both the start and duration of the laser lifetime extension mode may be controlled dynamically based on the current fill level of the buffer. The transition between reading mode and the laser lifetime extension mode may thus be adjusted dynamically based on current conditions of reading and reproduction, irrespectively of the type of contents to be reproduced, differences in the rate at which data is read by the optical head and the rate at which the read data is reproduced by the reproducing system, etc.

The duration of enablement of the reading and laser lifetime extension mode during reproduction of a given content may therefore not be fixed, but rather may be set dynamically based on the buffer fill level. Where the contents to be reproduced do not require the full capacity of the buffer and/or the incoming and outgoing data rates are similar, the whole content may be reproduced without the need of transiting to the laser lifetime extension mode. The number of laser light pulses during the duration of the laser lifetime extension mode may be determined by the CPU 130 using the parameters for the desired duty cycle and stored in the storage means 140.

Alternatively or in addition, the duration of the laser lifetime extension mode and/or reading mode may be controlled using fixed parameters that are set in advance and stored in the storage means 140 based on the characteristics of the reproducing system 100, such as buffer capacity, maximum rates of incoming data and outgoing data. The CPU 130 may then refer to the stored parameters for controlling the duration of the laser lifetime extension mode and/or reading mode and the transition between these operation modes.

Figure 10:
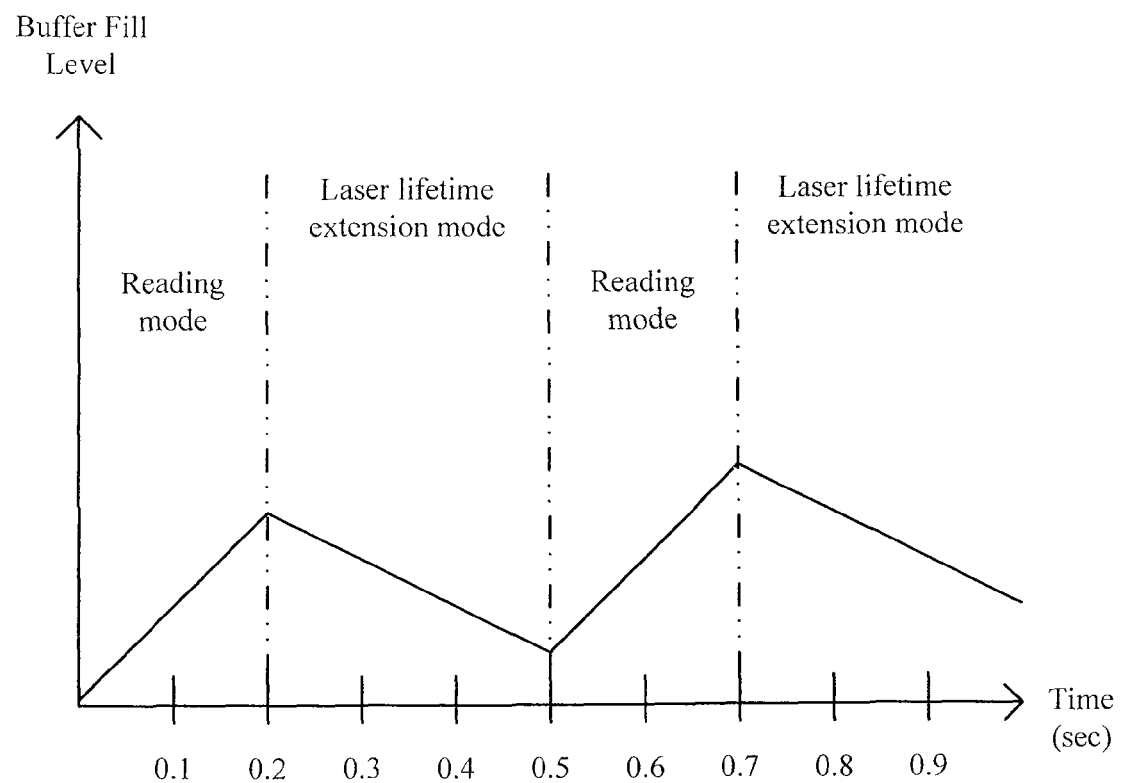
FIG. 10 is a graph showing an example of a buffer fill level of a reproducing system.

Alternatively or in addition, the duration of the laser lifetime extension mode and/or reading mode may be automatically or manually set based on a specified time interval, irrespective of the characteristics of the reproducing system 100 or buffer fill levels. An example of a system where the duration of the laser lifetime extension mode was set to 0.3 seconds and the reading mode was set to 0.2 seconds is shown in FIG. 10. While the system may be efficient when the buffer fill level increases during the reading mode in the same or similar proportions to the buffer fill level decreases during the laser lifetime extension mode, as shown in FIG. 10, this is not required and may not be necessary in systems where the buffer is sufficiently large.

The reproducing system 100 may be a reproducing/recording apparatus or system, or may be a reproducing-only apparatus or system. The reproducing system 100 may include reproduction means for reproducing the audio and/or video signals obtained from the data read by the optical head. The described system may be applicable to an optical drive that obtains audio and/or video signals from the data recorded in the optical disc and supplies the obtained audio and/or video signals to internal or external reproduction means to be reproduced.

The systems and processes described may be encoded, or partially encoded, in a computer readable medium such as a memory, programmed within a device such as one or more integrated circuits, and one or more processors or processed by a controller or a computer. If the methods are performed by software, the software may reside in a memory resident to or interfaced to a storage device, a synchronizer, a circuit or electronic device designed to send data to another location, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," may include any non-transitory memory device that includes, stores, software for use by or in connection with an instruction executable system, apparatus, or device. The machine-readable medium may selectively be, but not limited to, an electronic, magnetic, optical, electromagnetic, infrared, or semiconductor system, apparatus or device. A non-exhaustive list of examples of a machine-readable medium would include: a portable magnetic or optical disk, a volatile memory such as a Random Access Memory "RAM", a Read-Only Memory "ROM", or an Erasable Programmable Read-Only Memory (EPROM or Flash memory. A machine-readable medium may also include a non-transitory tangible medium upon which software is stored, as the software may be electronically stored as an image or in another format (e.g., through an optical scan), then compiled, and/or interpreted or otherwise processed.

In an alternative embodiment, dedicated hardware implementations, such as application specific integrated circuits, programmable logic arrays and other hardware devices, can be constructed to implement one or more of the systems, functions, or methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, as well as combinations of these.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A reproducing system for reproducing data recorded on an optical record carrier, the system comprising:
   an optical head configured to read data recorded on an optical record carrier in a reading mode, the optical head comprising a light source configured to generate a light output on the optical record carrier;
   a light source driver unit configured to modulate the light output;
   where the light output is a continuous light output during the reading mode;
   where the light output is a pulsed light output during a light source lifetime extension mode; and
   where the light source driver unit is configured to drive the light output to change from the continuous light output to the pulsed light output in response to a pause or interruption in the reading mode.

2. The reproducing system according to claim 1, where the light source driver unit is configured to drive the light output to change from the pulsed light output to the continuous light output in response to a resumption in the reading mode.

3. The reproducing system according to claim 1, further comprising:
   a buffer adapted to store the data recorded on the optical record carrier that is read by the optical head; and
   a system controller configured to monitor a fill level of the buffer and to control a transition between the light source lifetime extension mode and the reading mode based on the fill level of the buffer.

4. A reproducing system for reproducing data recorded on an optical record carrier, the system comprising:
   an optical head configured to read data recorded on an optical record carrier in a reading mode, the optical head comprising a light source configured to generate a light output on the optical record carrier;
   a light source driver unit configured to modulate the light output;
   where the light output is a continuous light output during the reading mode;
   where the light output is a pulsed light output during a light source lifetime extension mode;
   where the light source driver unit is configured to drive the light output to change from the continuous light output to the pulsed light output in response to a pause or interruption in the reading mode; and
   where the light source driver unit is configured to output a light source driving signal having a frequency to the light source during the light source lifetime extension mode, where the light source driving signal causes the light source to switch between a first light output level and a second light output level at the frequency, the first light output level higher than the second light output level.

5. The reproducing system according to claim 4, further comprising:
   a sampling controller configured to generate a light source driver control signal that controls the frequency of the light source driving signal output by the light source driver unit, where:
   the sampling controller is configured to generate a pulsed light source driver control signal with the frequency during the light source lifetime extension mode; and the light source driver unit is configured to output the light source driving signal with the frequency in response to the pulsed light source driver control signal.

6. The reproducing system according to claim 5, where the sampling controller is adapted to generate a continuous light source driver control signal during the reading mode and to change the continuous light source driver control signal to the pulsed light source driver control signal in response to the pause or interruption in the reading mode.

7. The reproducing system according to claim 4, the system further comprising:
a feedback sample-and-hold circuit configured to receive a light source monitor signal based on the light output by the light source, to sample and hold the light source monitor signal, and to output a signal indicative of the light source monitor signal; and
a feedback control circuit adapted to generate and output a feedback signal operable to control the light source driver unit to cause a subsequent light source monitor signal to converge to a reference value, the light source driver unit controlled by adjustment of a value of the light source driving signal based on the signal indicative of the light source monitor signal and the reference value;
where the feedback control circuit is configured to receive the light source monitor signal from the feedback sample-and-hold circuit; and
where the sampling controller is configured to generate and output a feedback sample-and-hold signal with a first frequency during the light source lifetime extension mode so as to control the feedback sample-and-hold circuit to sample the received light source monitor signal during the first light output level and to hold the sampled light source monitor signal during at least a duration of the subsequent low light output level.

8. The reproducing system according to claim 5, the system further comprising:
a focus servo system configured to perform focus control of the light output on the optical record carrier based on a focus light signal indicative of the light output reflected from the optical record carrier during the light source lifetime extension mode; and
a focus servo sample-and-hold circuit adapted to receive the focus light signal, to sample and hold the received focus light signal, and to output a signal indicative of the focus light signal to the focus servo system;
where the sampling controller is adapted to generate and output a focus sample-and-hold signal with a first frequency during the light source lifetime extension mode so as to control the focus servo sample-and-hold circuit to sample the received focus light signal when the light source is in the high light output level and to hold the focus light signal during at least a duration of the subsequent low light output level.

9. The reproducing system according to claim 5, further comprising:
a tracking servo system adapted to perform tracking control of the light output incident on a record track of the optical record carrier based on a signal indicative of the light output reflected from the optical record carrier;
where the tracking servo system is maintained engaged during the light source lifetime extension mode; and
where the sampling controller is configured to generate and output a tracking servo control signal with a first frequency during the light source lifetime extension mode so as to control the tracking servo system to perform the tracking control based on the signal indicative of the light output reflected from the optical record carrier that is obtained when the light source is in the high light output level.

10. The reproducing system according to claim 7, the system further comprising:
a focus servo system configured to perform focus control of the light output on the optical record carrier based on a focus light signal indicative of the light output reflected from the optical record carrier during the light source lifetime extension mode; and
a focus servo sample-and-hold circuit adapted to receive the focus light signal, to sample and hold the received focus light signal, and to output the focus light signal to the focus servo system;
where the sampling controller is adapted to generate and output a focus sample- and-hold signal with a second frequency during the light source lifetime extension mode so as to control the focus servo sample-and-hold circuit to sample the received focus light signal when the light source is in the high light output level and to hold the focus light signal during at least the duration of the subsequent low light output level;
a tracking servo system adapted to perform tracking control of the light output incident on a record track of the optical record carrier based on a signal indicative of the light output reflected from the optical record carrier;
where the tracking servo system is maintained engaged during the light source lifetime extension mode; and
where the sampling controller is configured to generate and output a tracking servo control signal with a third frequency during the light source lifetime extension mode so as to control the tracking servo system to perform the tracking control based on the signal indicative of the light output reflected from the optical record carrier that is obtained when the light source is in the high light output level; and
where during the light source lifetime extension mode the sampling controller is adapted to synchronize at least one of the feedback sample-and-hold signal, focus sample-and-hold signal, and tracking servo control signal with the pulsed light source driver control signal.

11. The reproducing system of claim 1, further comprising:
a sampling controller configured to generate a light source driver control signal that controls the frequency of the light source driving signal output by the light source driver unit;
a feedback control system coupled to the sampling controller and configured to provide feedback to the laser driver unit indicative of the optical power of the light output by the light source;
a focus servo system coupled to the sampling controller and configured to perform focus control of the light output on the optical record carrier; and
a tracking servo system coupled to the sampling controller and configured to perform tracking control of the light output incident on a record track of the optical record carrier;
where the feedback control system, the focus servo system, and the tracking servo system are enabled and disabled by the system controller.

12. The reproducing system of claim 11, where the light source driver control signal synchronizes operation of the feedback control system, operation of the focus servo system, and operation of the tracking servo system with operation of the light source driver unit.

13. A non-transitory computer readable storage medium having stored therein data representing instructions executable by a processor for reproducing data from an optical carrier with a reproducing system, the storage medium comprising:
  instructions to operate an optical head in a reading mode;
  instructions to monitor a buffer fill level of a buffer;
  instructions to pause the operation of the optical head in the reading mode and operate the optical head in a light source lifetime extension mode in response to detection that the buffer fill level has reached an upper threshold;
  instructions to resume operation of the optical head in the reading mode in response to detection that the buffer fill level has reached a lower threshold;
  where the optical head outputs a continuous light output during the reading mode and a pulsed light output during a light source lifetime extension mode.

14. The storage medium of claim 13, further comprising:
  instructions to end operation of the optical head in response to detection that the buffer fill level has reached an empty level.

15. The storage medium of claim 13, where during the reading mode, the optical head is instructed to read data from the optical carrier, and where during the light source lifetime extension mode, the optical head is not instructed to read data from the optical carrier.

16. The storage medium of claim 13, where the instructions to operate the optical head in the reading mode comprise instructions to control the optical head to output a continuous light source light directed at the optical carrier and to read data from the optical carrier; and
  where the instructions to operate the optical head in the light source lifetime extension mode comprise instructions to control the optical head to output a pulsed light source light directed at the optical carrier.

17. A non-transitory computer readable storage medium having stored therein data representing instructions executable by a processor for reproducing data from an optical carrier with a reproducing system, the storage medium comprising:
  instructions to enable an operating mode of the reproducing system, where the operating mode may be a reading mode or a light source light extension mode;
  instructions to generate a continuous light source driver control signal in response to enablement of the reading mode, where the continuous light source driver control signal is operable to control an optical head to output a continuous light output to an optical carrier; and
  instructions to generate a pulsed light source driver control signal in response to enablement of the light source lifetime extension mode, where the pulsed light source driver control signal is operable to control the optical head to output a pulsed light output to the optical carrier.

18. The storage medium of claim 17, further comprising:
  instructions to monitor a buffer fill level of a buffer, where the buffer fill level indicates an amount of data in the buffer; and
  where the instructions to detect an operating mode of the reproducing system comprise:
    instructions to enable the reading mode as a default operating mode;
    instructions to enable the light source lifetime extension mode in response to detection that the buffer fill level has reached an upper threshold; and
    instructions to enable the reading mode in response to detection that the buffer fill level has reached a lower threshold.

19. The storage medium of claim 17, further comprising:
  instructions to read data from the optical carrier during the reading mode; and
  instructions to not read data from the optical carrier during the light source lifetime extension mode.

20. The storage medium of claim 17, where the pulsed light source driver control signal oscillates between a first output signal and a second output signal, the first output signal higher than the second output signal.

21. A non-transitory computer readable storage medium having stored therein data representing instructions executable by a processor for controlling a light source in a reproducing system, the storage medium comprising:
  instructions to receive, from a feedback control circuit, a light source reference signal, where the light source reference signal is indicative of a desired optical power of a light emitted by the light source;
  instructions to receive, from a controller, a light source driver control signal, where the light source driver control signal indicates a timing requirement of a light emitted by the light source;
  instructions to generate a light source driving signal based on the light source reference signal and the light source driver control signal; and
  instructions to output the generated light source driving signal to the light source;
  where the received light source driver control signal may be a continuous light source driver control signal or a pulsed light source driver control signal;
  where the instructions to generate a light source driving signal comprise instructions to generate a continuous light source driving signal in response to receiving the continuous light source driver control signal; and
  where the instructions to generate a light source driving signal comprise instructions to generate a pulsed light source driving signal in response to receiving the pulsed light source driver control signal.

22. The storage medium of claim 21, where the light source reference signal is a signal generated by comparing a sampled emitted light from the light source and a reference value.

23. A reproducing system for reproducing data from an optical carrier, the reproducing system comprising:
  a processor;
  a light source means for emitting a light on an optical carrier;
  a detecting means for detecting light reflected by the optical carrier;
  where the processor is configured to energize the light source means to emit a continuous light during a reading mode and to energize the light source means to emit a pulsed light during a light source lifetime extension mode.

24. The reproducing system of claim 23, where the detecting means reads data from the optical record carrier during the reading mode, and does not read data from the optical record carrier during the light source lifetime extension mode.

25. The reproducing system of claim 23, where during the light source lifetime extension mode, the light source means emits a light that oscillates between a first light output and a second light output, the first light output being higher than the second light output.

26. The reproducing system of claim 25, further comprising:
a feedback control means for monitoring the power of the light emitted by the light source means;
a tracking means for monitoring the tracking of the light emitted by the light source means;
a focus means for monitoring the focus of the light emitted by the light source means;
where the processor is configured to synchronize, during the light source lifetime extension mode, the feedback control means, the tracking means, and the focus means to monitor the signal only when the light source emits the first light output.

* * * * *